United States Patent [19]

Rao et al.

[11] Patent Number: 4,892,797
[45] Date of Patent: Jan. 9, 1990

[54] BIPOLAR ELECTRODE AND PROCESS FOR MANUFACTURING SAME

[75] Inventors: Bhaskara M. L. Rao, Flemington; William Kobasz, Edison; James C. Menke, Long Valley, all of N.J.

[73] Assignee: Alupower, Inc., Warren, N.J.

[21] Appl. No.: 321,896

[22] Filed: Mar. 10, 1989

[51] Int. Cl.$^4$ .............................................. H01M 6/48
[52] U.S. Cl. .................................................... 429/210
[58] Field of Search ........................ 429/210, 211, 152

[56] References Cited

U.S. PATENT DOCUMENTS

| | | | |
|---|---|---|---|
| 3,170,820 | 2/1965 | Drenglen et al. | 429/210 X |
| 3,565,694 | 2/1971 | Chireau | 429/210 |
| 4,091,184 | 5/1978 | Erisman et al. | 429/210 X |
| 4,124,747 | 11/1978 | Murer et al. | 429/210 |
| 4,188,464 | 2/1980 | Adams et al. | 429/210 |
| 4,562,113 | 12/1985 | Yonahara et al. | 429/210 X |
| 4,713,306 | 12/1987 | Pinsky et al. | 429/210 X |

Primary Examiner—Anthony Skapars
Attorney, Agent, or Firm—Louis E. Marn

[57] ABSTRACT

There is described an improved bipolar electrode comprised of an intermediate double-sided adhesive conductive plastic film or layer disposed between electronegative and electropositive layers wherein the intermediate layer has a volume resistivity of at least 0.5 ohm-cm. as well as a process for manufacturing same by passing a laminate of such layers through a pressure roller assembly at pressures between 30 to 500 psig.

11 Claims, 1 Drawing Sheet

BIPOLAR ELECTRODE AND PROCESS FOR MANUFACTURING SAME

BACKGROUND OF THE INVENTION (1) Field of the Invention

This invention relates to bipolar electrodes and method of manufacturing same, and more particularly to an improved process for manufacturing bipolar electrodes and bipolar electrodes produced thereby.

(2) Description of the Prior Art

A bipolar electrode for electrochemical cells or batteries are plate-like structures having two different electrochemical active materials on opposite surfaces. Electrodes of such type included an active electronegative base metal e.g. zinc, magnesium or aluminum in an electrolyte and an electropositive active material. Such electrodes have been made by coating a sheet of the base metal with an adhesive layer containing the active material of opposite polarity distributed therethrough in finely comminuted form. The adhering polymeric matrix must be sufficiently conductive to form a low-resistance internal current path between the active base plate surface and the other electropositive active material.

The polymeric substance must be resistant to acidic electrolytes, such as chromic or sulfuric acid, and is exemplified by ethylene/vinylacetate copolymers (referred to hereinafter as E/VA) which is eminently suitable as a carrier and binder for finely comminuted metallic or carbonaceous particles serving as an electropositive active material. E/VA however, lack the necessary degree of adhesiveness, resulting in its blending with one another resinous substance, more specifically a polymer or copolymer of isobutylene (butyl rubber), with the resulting film incorporating both carbon black and graphite, applied under heat and pressure to the supporting metal sheet.

In U.S. Pat. No. 3,565,694 to Chireau, the process was refined to successive coatings applied under specific conditions. Bipolar support intercell connectors have evolved to complex film material etched to produce craters for depositing active materials, such as described in U.S. Pat. No. 4,091,184 to Erisman to the use of high compressive forces to provide electrical conductivity between the active layers through the conductive separator plates.

While bipolar electrodes of the prior art function in the electrochemical cells, construction of such bipolar plates result in non-uniformity, component separation, or may require mechanical intercell contact.

OBJECTS OF THE INVENTION

An object of the present invention is to provide an improved process for forming bipolar electrodes of simple processing steps.

Another object of the present invention is to provide an improved process for forming bipolar electrodes of uniform configuration.

Still another object of the present invention is to provide an improved process for forming bipolar electrodes for ease of assembly and of improved mechanical rigidity.

Yet another object of the present invention is to provide an improved bipolar electrode of simplistic fabrication.

A still further object of the present invention is to provide an improved bipolar electrode of increased reliability.

Yet still another object of the present invention is to provide an improved bipolar electrode for both cylindrical and flat plate primary and secondary batteries.

SUMMARY OF THE INVENTION

These and other objects of the present invention are achieved by laminating under lower pressures a double-sided adhesive conductive plastic film or layer of material between a sheet or layer of a cathode acting material and a sheet or layer of an anode acting material wherein the thermoplastic film is of a thickness of from 0.5 to 5 mils and a volume resistivity of at least 0.5 ohm-cm. and not more than 100 ohm-cm. to form a bipolar electrode.

BRIEF DESCRIPTION OF THE DRAWINGS

Further objects and advantages of the present invention will become apparent from the following detailed description when taken with the accompanying drawing, wherein.

DETAILED DESCRIPTION OF THE INVENTION

Figure 1:
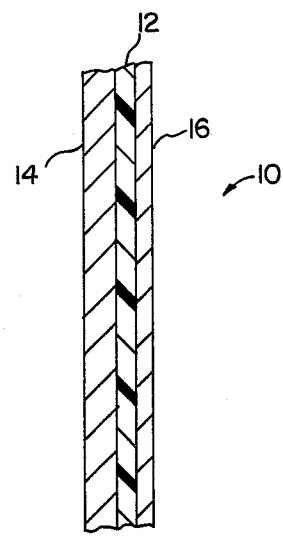
FIG. 1 is a cross-sectional view of a preferred embodiment of the present invention.

Referring to the drawing, there is illustrated a bipolar electrode laminate, generally indicated as 10, comprised of an electrically conductive laminating film or layer 12 laminated between an electronegative sheet or film of material 14 and an electropositive sheet or film of material 16.

The electrically conductive laminating film or layer 12 is formed of a thickness of less than about 5 mils and includes on each side, a pressure sensitive coating. The electrically conductive laminating film 12 is formed from a dispersion of electrically conductive particles in a film substrate. Such electrically conductive particles are exemplified by silver coated nickel particles are, of particle size distribution of from 0.1 to 25.0 $\mu m$ and in amount sufficient to provide a volume resistivity of at least about 0.5 ohm-cm. but not greater than about 100 ohm-cm.

The electronegative sheet or film 14 of an active material is formed of, e.g. an aluminum alloy foil or plate with thickness thereof determining capacity, i.e. small thickness, e.g. 2 mil foil providing for low capacity (AH/sq.in) electrode or thickness approaching one inch for a high capacity electrode. The electropositive sheet or film 16 of material is formed of silver, copper, nickel, lead and the like, with or without a coating of other materials. Additionally, the electropositive sheet or film may be formed of a carbon plastic or other conductive material compatible with the chemistry of a bipolar cathode. The electropositive film or sheet 16 is of a thickness of from 0.5 to 5 mils.

Figure 2:
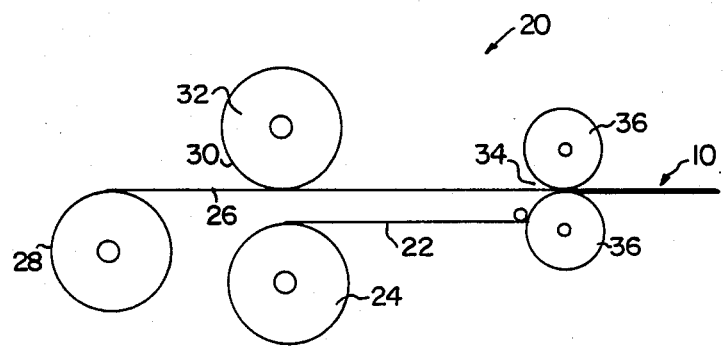
FIG. 2 is a schematic flow diagram of an assembly for forming a bipolar electrode according to the present invention.

Formation of the bipolar electrode 10 laminate is readily accomplished by passing the material components through a press assembly, generally indicated as 20, referring now to FIG. 2. In the event the component materials are in film or sheet thickness, of such materials i.e. a roll of electropositive material 22 is positioned in a lower spindle 24, a roll of the laminating conductive film 26 is positioned on intermediate spindle 28 and a roll of electronegative material 30 is positioned on upper spindle 32 of the press assembly 20. The films or sheets of the materials are coursed over supporting roller assemblies (not shown) and introduced into a nip 34 of pressure rollers 36 of the press assembly 20. The pressure rollers may be heated to a temperature of from 30° to 180° F. and under of from 20 to 500 psig. effect lamination of the films or sheets 22, 26, and 30 of the laminating components to form a sheet or film 10 of bipolar electrode laminate which is wrapped up on a product roller assembly (not shown).

It will be understood by one skilled in the art that increase in the thickness of the electronegative material (i.e. as a function of increased capacity will alter the processing or handling requirements of such electronegative material. Thus, when the thickness of the electronegative material does not permit handling on rolls thereof, the feeding station or assembly is modified to permit placement of finite length/width sizes of the electronegative material on the upper surface of the electrically conductive laminating film 26, shortly prior to introduction into the nip 34 of the pressure roller assembly 36 of the press assembly 20.

In accordance with the present invention bipolar electrode laminates are formed exhibiting excellent electrical conductivity, while being essentially free of pin holes, as well as being stable at elevated temperatures. Thus, low IR losses.

While the invention has been described in connection with an exemplary embodiment thereof, it will be understood that many modifications will be apparent to those of ordinary skill in the art; and that this application is intended to cover any adaptations of variations thereof. Therefore, it is manifestly intended that this invention be only limited by the claims and the equivalents thereof.

What is claimed:

1. A bipolar electrode structure, which comprises;

an electrically conductive intermediate layer of a thickness of less than about 5 mils having pressure sensitive adhesive surfaces and a volume resistively of at least 0.5 ohm-cm but less than 100 ohm.cm;

an electronegative layer disposed on a surface of said intermediate layer; and an electropositive layer disposed on an opposite surface of said intermediate layer.

2. The bipolar electrode structure as defined in claim 1 wherein said intermediate layer is of a plastic substrate.

3. The bipolar electrode structure as defined in claim 1 or 2 wherein said intermediate layer is of a thickness of from 0.5 to 5 mils.

4. The bipolar electrode structure as defined in claim 1 or 2 wherein said intermediate layer includes electrical conductive particles of a size distribution of from 0.1 to 25 μm.

5. The bipolar electrode structure as defined in claim 3 wherein said intermediate layer includes electrical conductive particles of a size distribution of from 0.1 to 25 μm.

6. The bipolar electrode structure as defined in claim 4 wherein said electrically conductive particles are silver coated nickel particles.

7. The bipolar electrode structure as defined in claim 5 wherein said electrically conductive particles are silver coated nickel particles.

8. The bipolar electrode structure as defined in claim 1 or 2 wherein said electronegative layer is aluminum.

9. The bipolar electrode structure as defined in claim 4 wherein said electronegative layer is aluminum.

10. The bipolar electrode structure as defined in claim 1 or 2 wherein said electropositive layer is a film of a thickness of from 0.5 to 5 mils.

11. The bipolar electrode structure as defined in claim 4 wherein said electropositive layer is a film of a thickness of from 0.5 to 5 mils.

* * * * *